(12) United States Patent
Foster et al.

(10) Patent No.: US 9,135,762 B2
(45) Date of Patent: Sep. 15, 2015

(54) DETERMINING OPERATIONAL STATE WITH TAGS

(71) Applicant: Rockwell Automation Technologies, Inc., Mayfield Heights, OH (US)

(72) Inventors: Wayne Foster, Tyngsborough, MD (US); Anatoly Grinberg, Brighton, MA (US); Dennis Mackey, Hamilton, MA (US); Michael Burdenko, Wellesley Hills, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/576,971

(22) Filed: Dec. 19, 2014

(65) Prior Publication Data
US 2015/0123765 A1    May 7, 2015

Related U.S. Application Data

(63) Continuation of application No. 13/303,799, filed on Nov. 23, 2011, now Pat. No. 8,941,493.

(51) Int. Cl.
*G08B 13/08* (2006.01)
*H04Q 5/22* (2006.01)
*G07C 9/00* (2006.01)
*G08C 17/02* (2006.01)
*G05B 19/048* (2006.01)
*F16P 3/14* (2006.01)

(52) U.S. Cl.
CPC ............ *G07C 9/00111* (2013.01); *G08C 17/02* (2013.01); *F16P 3/147* (2013.01); *G05B 19/048* (2013.01)

(58) Field of Classification Search
CPC ................. F16P 3/147; G05B 19/048; G05B 2219/25196
USPC ......................................................... 340/5.61
See application file for complete search history.

(56) References Cited

U.S. PATENT DOCUMENTS

2009/0140858 A1    6/2009    Gore et al.
2010/0097185 A1    4/2010    Bauchot et al.

OTHER PUBLICATIONS

Notice of Allowance dated Dec. 16, 2015 for U.S. Appl. No. 13/303,799, 10 pages.
Non-Final Office Action dated Apr. 24, 2014 for U.S. Appl. No. 13/303,799, 12 pages.

*Primary Examiner* — Steven Lim
*Assistant Examiner* — Omeed Alizada
(74) *Attorney, Agent, or Firm* — Amin, Turocy & Watson, LLP

(57) ABSTRACT

Systems and methods are provided relating to utilizing a plurality of RFID tags in conjunction with a circuit comprising at least one reed switch to facilitate determination of operational states and actions based thereon. A magnet can activate the reed switch causing a first RFID tag to be activated and transmit an associated RFID identifier from which a position/operation associated with the first RFID can be determined. The magnet can be removed to activate a second RFID tag whereupon a second RFID identifier is transmitted from which a second position/operation can be determined. The circuit comprising the reed switch and RFID tags can have an induction coil enabling the circuit to be activated when the induction coil is brought into proximity of a second induction coil and inductively coupled.

20 Claims, 10 Drawing Sheets

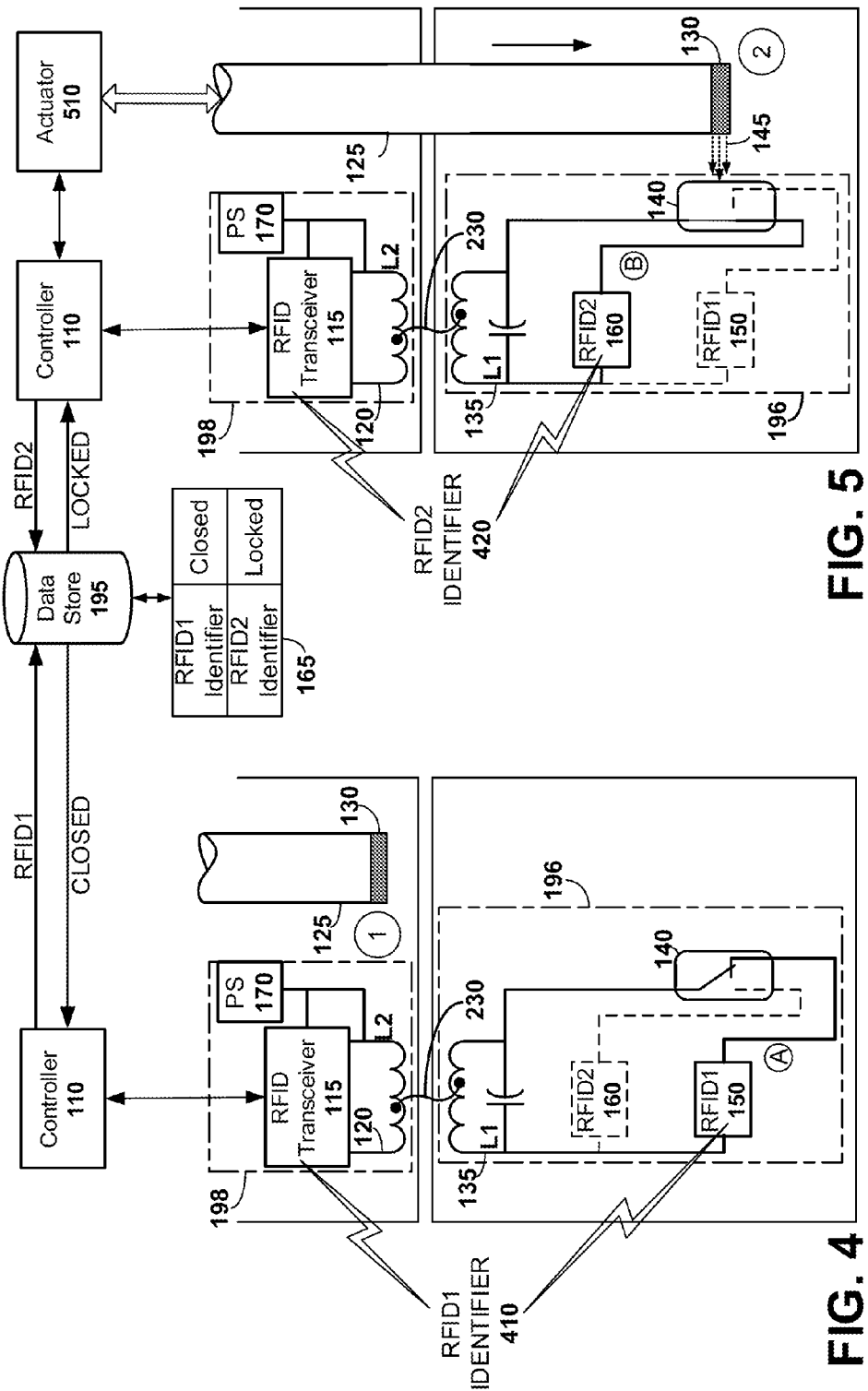

DETERMINING OPERATIONAL STATE WITH TAGS

RELATED APPLICATIONS

The present application claims priority to, and is a continuation of, U.S. patent application Ser. No. 13/303,799, filed Nov. 23, 2011, and entitled "DETERMINING OPERATIONAL STATE WITH TAGS," the entirety of which is incorporated herein by reference.

TECHNICAL FIELD

The subject specification relates generally to control systems employed in an industrial automation process and in particular to sensing and/or determining a position or operation of a device comprising the industrial process with tags, such as radio frequency identification tags.

BACKGROUND

A conventional approach for ascertaining operational safety of a system is failure analysis of the system. An aspect in determining the operational safety is the determination of the impact on safety resulting from failure of a particular process component, where such analysis can include applying weightings relating to safety, etc. However, certain faults may have a probability of failure that is negligible and, in effect, can be considered in the domain of 'fault exclusion', e.g., the fault is excluded from further consideration in determining operational safety. 'Fault exclusions' are declared with detailed justification in technical documentation relating to the operational safety of the process. Such operations are determined based upon any of a plurality of operational standards, such as ISO 13849.

However, newer standards are being introduced such that the concept of 'fault exclusion' is no longer acceptable when determining operational safety of a process. The newer standards, e.g., EN ISO 13849 Performance Level e (PLe) and EN 62061, can include safety category(ies)/level(s) such as safety integrity level (SIL), which defines a measurement of performance for a safety implemented function. A SIL can be applied to a process indicating most dependable (e.g., an SIL of 4) through to least dependable (e.g., an SIL of 1). For a process to be assigned a higher level of dependability, faults which were previously in the domain of 'fault exclusion' have to be defined.

For example, in a conventional system a position of a locking mechanism (e.g., engaged, open, etc.) may have previously been considered under the domain of 'fault exclusion', or a series of redundant locking mechanisms may have been provided to render the occurrence of lock failure technically improbable. As such, by utilizing the principle of 'fault exclusion', a process may only have a SIL 2 ranking. However, by quantifying one or more operations of the locking mechanism, e.g., (a) is the gate closed?, (b) is the gate locked?, (c) is the locking shaft engaged?, etc., an improved SIL ranking (e.g., a SIL 3 ranking) may be achieved in comparison with the SIL 2 ranking. Furthermore, an extension of attempting to achieve an improved SIL ranking may result in further information being available regarding operation of the locking mechanism, such as an identifier for the locking mechanism, an operational state (e.g., closed, locked, etc.), and the like. Such information, for example, can be utilized in a process utilizing an output signal switching device (OSSD) and in response to an OFF state being generated, for example, a safety-related control system associated with a machine can interrupt a circuit associated with a machine primary control element (MPCE) to place the machine in a safe operating state, as utilized with regard to final switching device (FSD) technologies, for example.

The above-described issues regarding the concept of 'fault exclusion' in view of more descriptive standards are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow. It is be appreciated that the detailed description may include additional or alternative embodiments beyond those described in this summary.

Systems and methods are provided to facilitate determination of a position and/or operation associated with one or more components comprising a device.

In an embodiment, a magnet in combination with a reed switch is utilized to facilitate activation/deactivation of a plurality of radio-frequency identification (RFID) tags. In a first position, e.g., where the reed switch is not activated by the magnet (e.g., the magnet is in a remotely located), an RFID tag associated with the first position is activated and transmits a first RFID identifier. As the magnet is placed in a second position, the reed switch is activated, and a second RFID tag associated with the second position is activated and transmits a second RFID identifier.

In an embodiment, prior to operation, the first RFID identifier can be associated with a first operation/position and the second RFID identifier can be associated with a second operation/position of the device. A RFID transceiver can receive the first RFID identifier and/or the second RFID identifier and, based thereon, a determination can be made as to the state of operation, position, etc.

In an embodiment, the reed switch, first RFID tag and second RFID tag can comprise an electrical circuit (position sensing circuit), wherein the activation/deactivation (e.g., 'open'/'closed') of the reed switch by the magnet (e.g., magnet is linearly placed in/removed from proximity with the reed switch) facilitates activation of a first portion of the circuit (e.g., comprising the first RFID tag) or the second portion of the circuit (e.g., comprising the second RFID tag).

In a further embodiment, the position sensing circuit in unpowered. The position sensing circuit further includes a first induction coil. The position sensing circuit can operate in association with a power generation/RFID sensing circuit (hereinafter RFID sensing circuit). The RFID sensing circuit includes a RFID transceiver, a power supply and a second induction coil. When the first induction coil of the position sensing circuit is brought within magnetic flux range of the second induction coil of the RFID sensing circuit, an induced current/voltage is generated in the position sensing circuit thereby providing power for the various components comprising the position sensing circuit. Hence, in an embodiment, when the first induction coil and second induction coil are not within range for coupled induction to occur, the position sensing circuit is unpowered and the RFID tags, etc., are not operating in an active manner.

In an embodiment, the RFID transceiver can forward the received RFID identifiers to a controller/remote system, which can review the RFID identifiers (in conjunction with the associated operation/position) and determine a subsequent operation. For example, when a first RFID identifier signal is received indicating a gate is closed, the controller can instruct an actuator to position the shaft/magnet at a position associated with the second RFID identifier signal to facilitate, for example, a locking operation to be performed.

In another embodiment, as the RFID identifiers are received, the RFID identifier information and any associated information can be reviewed locally or forwarded to a remote system to facilitate logging of operations performed by the device associated with the RFID tags. The RFID information can comprise of any pertinent information such as RFID identifier, operation performed, a machine identifier (wherein the machine identifier can uniquely identify a machine, device, process, operation, and the like, associated with the RFID identifier), position of magnet, timestamp of operation, etc.

In a further embodiment, the RFID identifiers, associated information, etc., can be stored in a data store/database for query/retrieval by the controller/remote system.

In a further embodiment, the magnet can be located on the end of the shaft, where the shaft slides linearly back and forth. In another embodiment, the magnet can be located at a point along the length of the shaft, e.g., at a midpoint, a quarter position, a third of the way along the length, etc. Further, rather than the shaft being moved in a linear position, the shaft can be rotated bringing the magnet in and out of proximity of the reed switch. Further the magnet can be located on a rotating component (e.g., a disc or the like).

In another embodiment, a series of reed switches (and associated RFID tags) can be utilized to sense a plurality of positions of the magnet as the magnet moves in/out of proximity of each respective RFID tag. Each RFID tag can be associated with a position/operation enabling determination of component placement within a process.

A device implementing various embodiments presented herein can be located in an industrial process as well as any other pertinent operation/environment. For example, in one embodiment, the device is a lock securing a gate, where in one aspect the gate can be located on a machine, while in another aspect the lock can be utilized on a safe in a financial institution, securing a door in a home/office environment, etc.

These, and other embodiments, are described in more detail below.

BRIEF DESCRIPTION OF THE DRAWINGS

Various non-limiting embodiments are further described with reference to the accompanying drawings in which:

FIG. 4 is a block diagram illustrating an exemplary, non-limiting embodiment of components being activated/deactivated during operational adjustment in linear position of a shaft/magnet.

FIG. 5 is a block diagram illustrating an exemplary, non-limiting embodiment of components being activated/deactivated during operational adjustment in linear position of a shaft/magnet.

DETAILED DESCRIPTION

As previously described, by generating information regarding an operational state of a device it is possible to obtain an improved safety rating (e.g., SIL level) in comparison with a similar operation where a device is not given a safety ranking, and is effectively ignored under the provision of 'fault exclusion'. By sensing operation of a device, information pertaining to the device can be generated enabling subsequent determination of device operation and also safety related features such as logging operation of the device, identifying a next available operation for the device, and the like.

It is to be appreciated that while the various embodiments presented herein disclose operation of a reed switch in combination with a magnetic field, the various embodiments are not so limited and any switching component which operates (e.g., opens/closes) in the presence of a magnetic field is applicable to the various embodiments presented herein. Hence, while the term 'reed switch' is used herein, terms including switch, magnetic switch, magnetically activated switch, etc., can equally be used.

Figure 1:
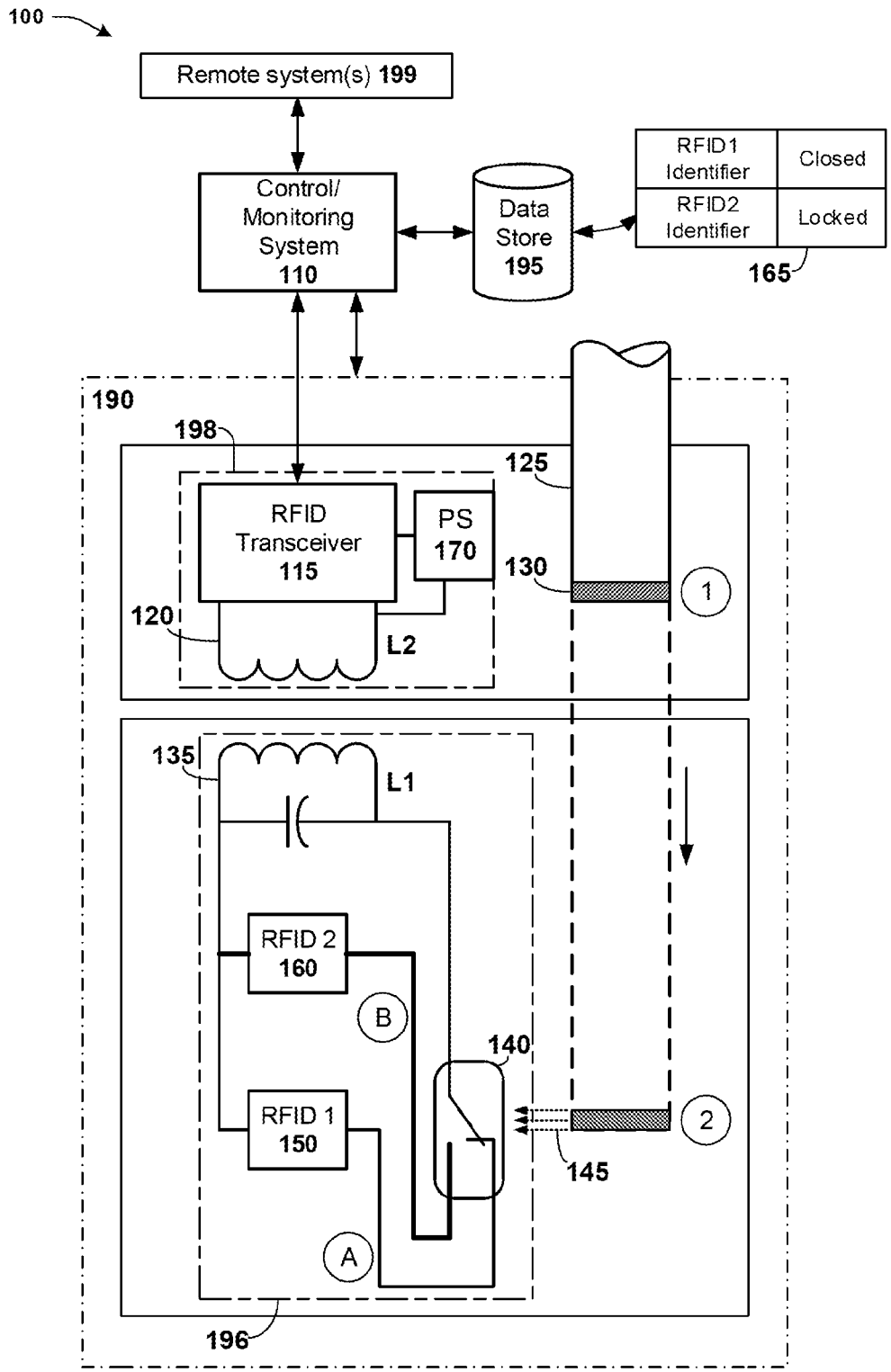
FIG. 1 is a block diagram illustrating an exemplary, non-limiting embodiment for providing information regarding a plurality of locations pertaining to a device.

FIG. 1 illustrates a block diagram of an exemplary, non-limiting embodiment for providing information regarding an operational state (e.g., positional state) pertaining to a device. The system utilizes a magnet in combination with a reed switch to facilitate activation/deactivation of a plurality of radio-frequency identification (RFID) tags.

A control/monitoring system 110 (referred to hereinafter as controller 110) is monitoring and/or controlling operation of an industrial device 190. It is to be appreciated that industrial operation 190 can be any of a machine, a plurality of machines, a sub-component of the machine, a process, a plurality of processes, device, apparatus, etc. Associated with device 190 is a position sensing circuit 196 comprising a first induction coil 135 (L1), a reed switch 140, a first RFID tag, RFID1 150 and a second RFID tag, RFID2 160. The position sensing circuit 196 comprises a plurality of electrical paths, including paths A and B, which are respectively activated based on the respective position of the reed switch 140 (as will be described further below). It is to be noted that the position sensing circuit 196 can be unpowered, e.g., no battery or power supply is incorporated into the circuit.

Position sensing circuit 196 operates in conjunction with a power generation/RFID sensing circuit 198 (hereinafter referred to as an RFID sensing circuit 198). The RFID sensing circuit 198 comprises of a second induction coil 120 (L2) operating in conjunction with an RFID transceiver 115, and power supply 170. Further, a shaft 125 with an attached magnet 130 operates in conjunction with position sensing circuit 196 and RFID sensing circuit 198, where shaft 125 can operate slideably in a linear manner as shown by magnet 130 being respectively placed at position 1 and position 2. In the retracted position 1, magnet 130 is positioned at a sufficient distance to not cause reed switch 140 to activate (e.g., reed switch 140 is 'open') and RFID1 150 can be activated. However, when positioned at 2, the magnetic field 145 of magnet 130 is of a magnitude to activate reed switch 140 to the 'closed' position thereby activating RFID2 160, as described further below. It is to be appreciated that while positions of reed switch 140 are described herein as being in respective 'open' and 'closed' positions, the positions can be reversed based upon the operation of the reed switch, circuit to be activated, etc.

Further, as shown in FIG. 1, controller 110 can be associated with a data store 195 which can be utilized to store/retrieve RFID information 165 (e.g., tag identifiers, etc.) associated with RFID1 150 and RFID2 160. In an embodiment, data store 195 comprises RFID information 165 comprising a rudimentary identifier and operation status, e.g., RFID1 identifier indicates device 190 is 'closed' and RFID2 identifier indicates device 190 is 'locked'. Hence, when RFID transceiver 115 receives a signal from RFID1 150 it can be determined that device 190 is closed, and when RFID transceiver 115 receives a signal from RFID2 160 it can be determined that device 190 is locked.

Further controller 110 can be operating in conjunction with a remote system 199, where information can be conveyed by controller 110 to remote system 199 (e.g., which of, if any, RFID1 or RFID2 is active). And vice-versa, information can be received from the remote system 199 based upon which RFID tag is active (e.g., proceed with operation associated with device 190, terminate operation associated with device 190, etc.). Such operational commands can be generated by at least one of controller 110, remote system 199, or other apparatus capable of receiving information regarding operation of device 190 (e.g., receive RFID information) and generating commands/instructions/operations based thereon.

It is to be appreciated that while FIG. 1 illustrates magnet 130 being located on the end of shaft 125, the various embodiments presented herein are not so limited. Magnet 130 can be located at any location along the length of shaft 125, for example, where the shaft may have been grooved and the groove subsequently filled with magnetic material. Hence, the various embodiments presented herein are not limited to a shaft with an end magnet but rather the magnet can be located at a mid point of the shaft, a quarter point, a third point, etc., enabling the position of the shaft to be determined as the shaft slidably passes the reed switch.

Figure 2:
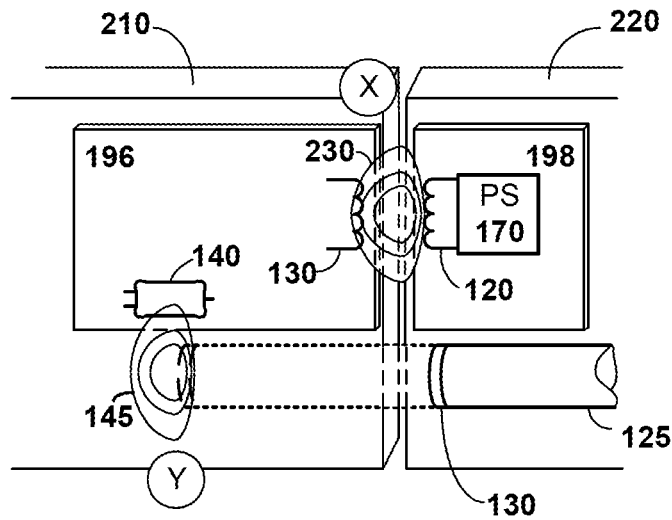
FIG. 2 is a block diagram illustrating an exemplary, non-limiting embodiment to identify respective positions of a gate and locking mechanism.

FIG. 2 is a block diagram illustrating an exemplary, non-limiting embodiment of various aspects presented herein being utilized to identify respective positions of a gate and locking mechanism. To facilitate understanding, certain components illustrated in FIG. 1 are depicted—position sensing circuit 196 is located on component 210, and the RFID sensing circuit 198 is located on component 220, where, for example, components 210 and 220 may be respective parts of a gate and gateframe. As illustrated, RFID sensing circuit 198 comprises power supply 170 activating induction coil 120. In a first position, X, as gate 210 is brought into proximity with frame 220, e.g., the gate is closed, the induced magnetic field of coil 120 activates induction coil 130 which activates position sensing circuit 196. However, shaft 125 is in the retracted position (FIG. 1, position 1) and accordingly magnet 130 is in a position such that magnet 130 has no effect on the operation of reed switch 140 (e.g., reed switch 140 is 'open').

At the second position Y, shaft 125 (in this embodiment acting as a locking shaft) is located in the extended position (FIG. 1, position 2) and magnet 130 is positioned such that magnetic field 145 of magnet 130 activates reed switch 140 (e.g., reed switch 140 is 'closed'). Subsequently, locking shaft 125 can be returned to the retracted position (FIG. 1, position 1) whereupon reed switch 140 is deactivated (e.g., reed switch 140 is 'open'). Furthermore, gate 210 can be subsequently reopened thus deactivating the induced circuit resulting from the induced coupling of induction coils 120 and 130.

In an embodiment where position sensing circuit 196 and RFID sensing circuit 198 form part of a locking device, the sensing of two objects (e.g., gate closed and bolt engaged) can be conducted by a single interface. With a conventional system, a series of redundant locks could be used to provide a secure locking system, however such an approach can be bulky and expensive. And further, a first sensing technique could be used to sense a gate being closed, and a second sensing technique to determine the bolt is engaged, but such an approach can also be bulky and expensive.

Figure 3:
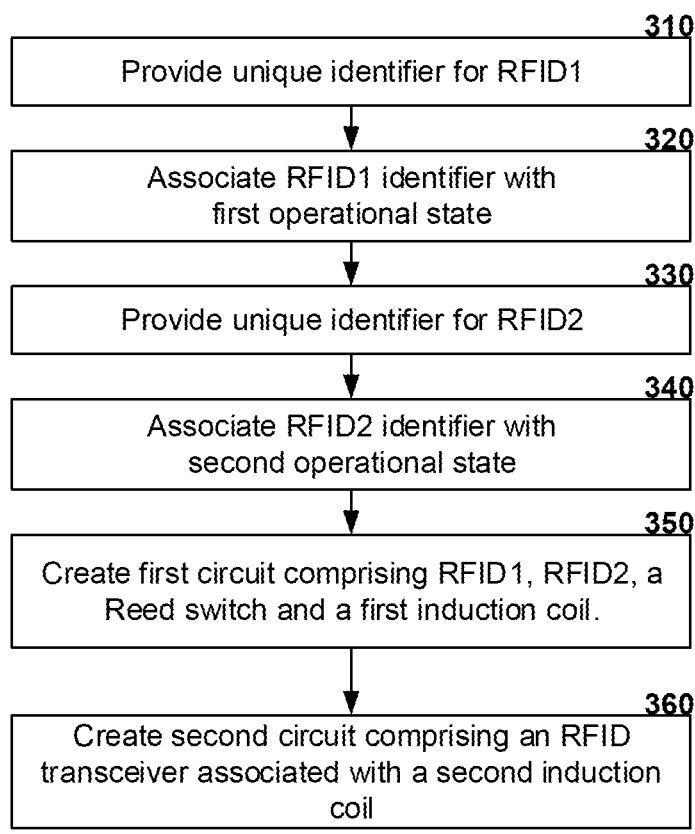
FIG. 3 is a flow diagram illustrating an exemplary, non-limiting embodiment for constructing a RFID/reed switch circuit to sense position of components for process safety.

FIG. 3 is a high-level flow diagram illustrating an exemplary, non-limiting embodiment for constructing a RFID/reed switch circuit to sense the operational condition(s) of a component for process safety. At 310, a unique identifier is generated for a first RFID tag (e.g., RFID1 150). In an embodiment, the RFID tag can be active in nature, e.g., powered, and transmits its identification information when activated. In another embodiment, the RFID tag can be passive and transmits its identification information in response to receipt of a radio signal received from a RFID tag reader (e.g., when RFID transceiver 115 is operating as an active reader).

At 320, the unique identifier of the first RFID tag can be stored in a database (e.g., database 165 of data store 195) and associated with a first operating state. For example, the first RFID identifier indicates device 'closed'.

At 330, a unique identifier is generated for a second RFID tag (e.g., RFID2 160). Similar to the first RFID tag, the second RFID tag can operate in an active manner or a passive manner.

At 340, the unique identifier of the second RFID tag can be stored in a database (e.g., database 165 of data store 195) and associated with a second operating state. For example, the second RFID identifier indicates device lock 'engaged'.

At 350, a first circuit (e.g., position sensing circuit 196) is constructed comprising of the first RFID tag, the second RFID tag, a reed switch (e.g., reed switch 140) and a first induction coil (e.g., induction coil 135). As previously mentioned, the first circuit does not need to be directly coupled to a power supply.

At 360, a second circuit (e.g., RFID sensing circuit 198) is constructed comprising of a second induction coil (e.g., induction coil 120), a RFID transceiver (e.g., RFID transceiver 115) and a power supply (e.g., power supply 170), where the power supply can power the RFID transceiver and the second induction coil.

Figure 8:
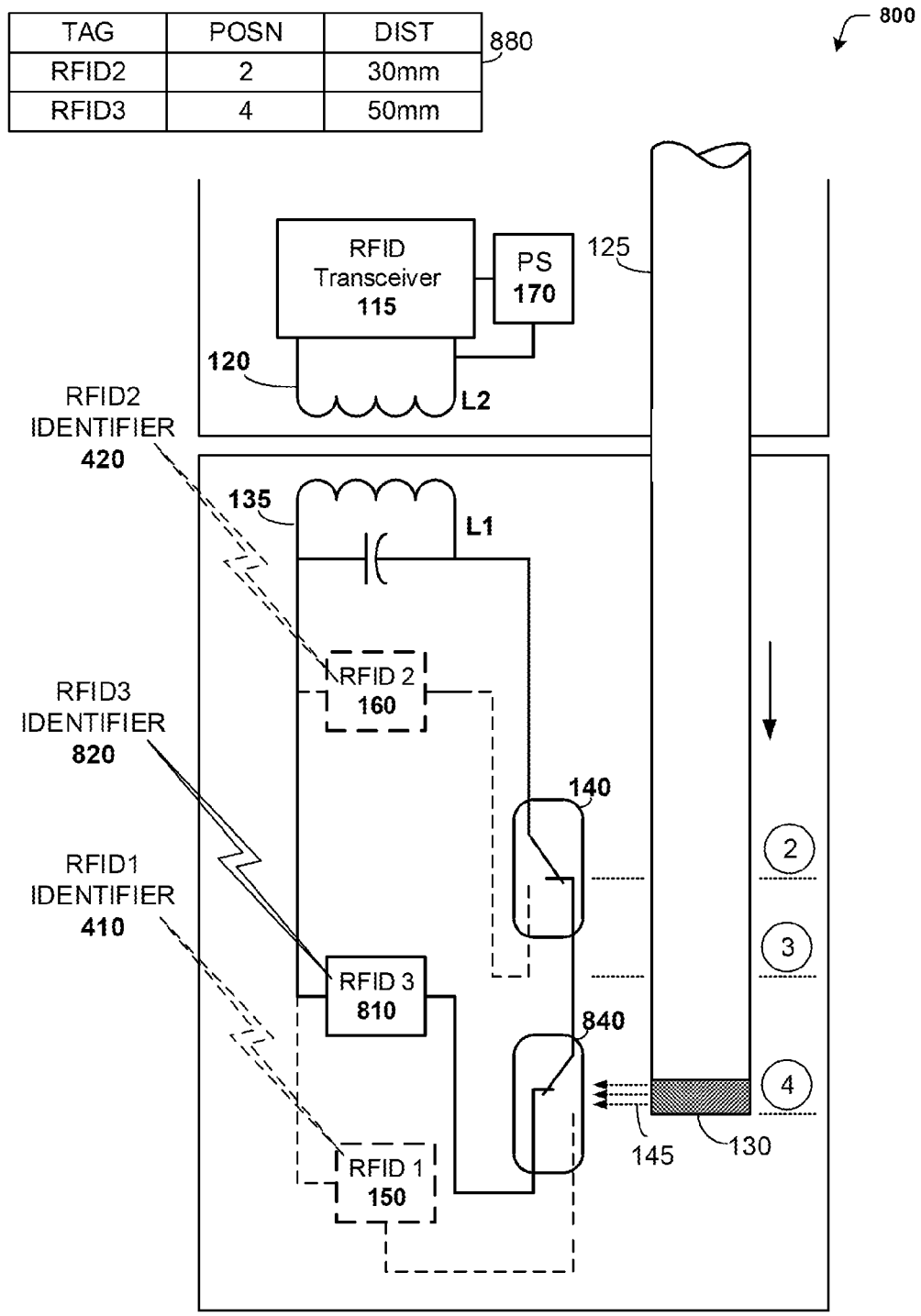
FIG. 8 illustrates a block diagram of an exemplary, non-limiting system for providing information regarding a plurality of locations pertaining to a device.

It is to be appreciated that selection of any of reed switch 140, first induction coil 135, second induction coil 120, and magnet 130 is based upon a plurality of factors. The following conveys some of the factors of possible concern but does not provide an exhaustive list, and other factors affecting selection are also considered within the spirit of the various embodiments presented herein. For example, depending upon the operating distance between the first induction coil 135 and the second induction coil 120, selection of actual coils can be a function of the second induction coil having sufficient magnetic flux to activate the first induction coil (and associated circuitry). In another embodiment, the required current/voltage to be induced into the position sensing circuit 196 can affect the size and/or operating conditions of the first induction coil 135 and the second induction coil 120. In another example, the magnitude of the magnetic field 145 generated by magnet 130 is determined such that magnet 130 has to be in a specific position relative to reed switch 140 before reed switch 140 is activated. If a number of reed switches are in close proximity to each other (as depicted in FIG. 8), it is necessary to ensure that the magnetic field of magnet 130 is not of a magnitude that more than one reed switch are simultaneously active (e.g., closed) as more than one of the associated RFID's may be transmitting simultaneously and it is not possible to determine the exact position of shaft 125/magnet 130.

FIGS. 4 and 5 can be read in combination and respectively illustrate exemplary, non-limiting block diagrams of components being activated/deactivated during operational adjustment of the linear position of shaft 125 and magnet 130. FIG. 4 illustrates non-limiting, exemplary components activated when the shaft 125 is located in a retracted position 1. As previously described with reference to FIG. 2, position sensing circuit 196 and RFID sensing circuit 198 are in proximity such that position sensing circuit 196 is activated (e.g., by magnetic flux 230) by induction coil 120 via induction coil 135. For example, position sensing circuit 196 and RFID sensing circuit 198 are proximate owing to a safety gate being closed, as described in FIG. 2.

With shaft 125 and magnet 130 being in position 1, the magnetic field of magnet 130 is sufficiently distant from reed switch 140 such that reed switch 140 is in an 'open' position and the position sensing circuit 196 is in a state such that circuit path A is active. Owing to circuit path A being active, RFID1 150 is active and, where RFID1 150 is an active RFID tag, RFID1 150 is transmitting its unique identifier 410. The RFID1 identifier 410 is received at RFID transceiver 115, which forwards the RFID 1 identifier 410 to controller 110. Upon receipt of RFID 1 identifier 410, controller 110 can query data store 195 indicating that RFID1 has been received, 'what is the operating state of the system?' In response to the query, a determination is made, based upon the earlier association of RFID1 with a first operational state (reference FIG. 1, database 165 and FIG. 3-320), that owing to RFID1 150 being active, the gate is 'closed'.

FIG. 5 illustrates non-limiting, exemplary components activated when shaft 125 is located in an extended position 2. Owing to the gate being closed (as can be determined by RFID1 150 being active), as previously described with reference to FIGS. 2 and 4, controller 110 can instruct actuator 510 to adjust the position of shaft 125/magnet 130, whereupon the shaft 125/magnet 130 is moved to extended position 2.

As previously described, position sensing circuit 196 and RFID sensing circuit 198 are in proximity such that position sensing circuit 196 is activated (e.g., by magnetic flux 230) by induction coil 120 via induction coil 135.

With shaft 125 and magnet 130 being in extended position 2, the magnetic field of magnet 130 is sufficiently proximate to reed switch 140 such that reed switch 140 is activated and in a 'closed' position, rendering the position sensing circuit 196 to be in operational state such that circuit path B is active. Owing to circuit path B being active, RFID2 160 is active and, where RFID2 160 is an active RFID tag, RFID2 160 is transmitting its unique identifier 420. The RFID2 identifier 420 is received at RFID transceiver 115, which forwards RFID2 identifier 420 to controller 110. Upon receipt of RFID2 identifier 420, controller 110 can query data store 195/database 165 indicating that RFID2 has been received, 'what is the operating state of the system?' In response to the query, a determination is made, based upon the earlier association of RFID2 with a second operational state (reference FIG. 1, database 165 and FIG. 3-340), that owing to RFID2 160 being active, the gate is 'locked'.

In an embodiment, RFID 1 identifier 410 and RFID2 identifier 420 can be disparate signals, for example, the frequency of RFID1 identifier 410 is different to the frequency of RFID2 identifier 420. Other techniques for generation of disparate signals by RFID 150 and RFID2 160 can be utilized as is known in the art.

Figure 6:
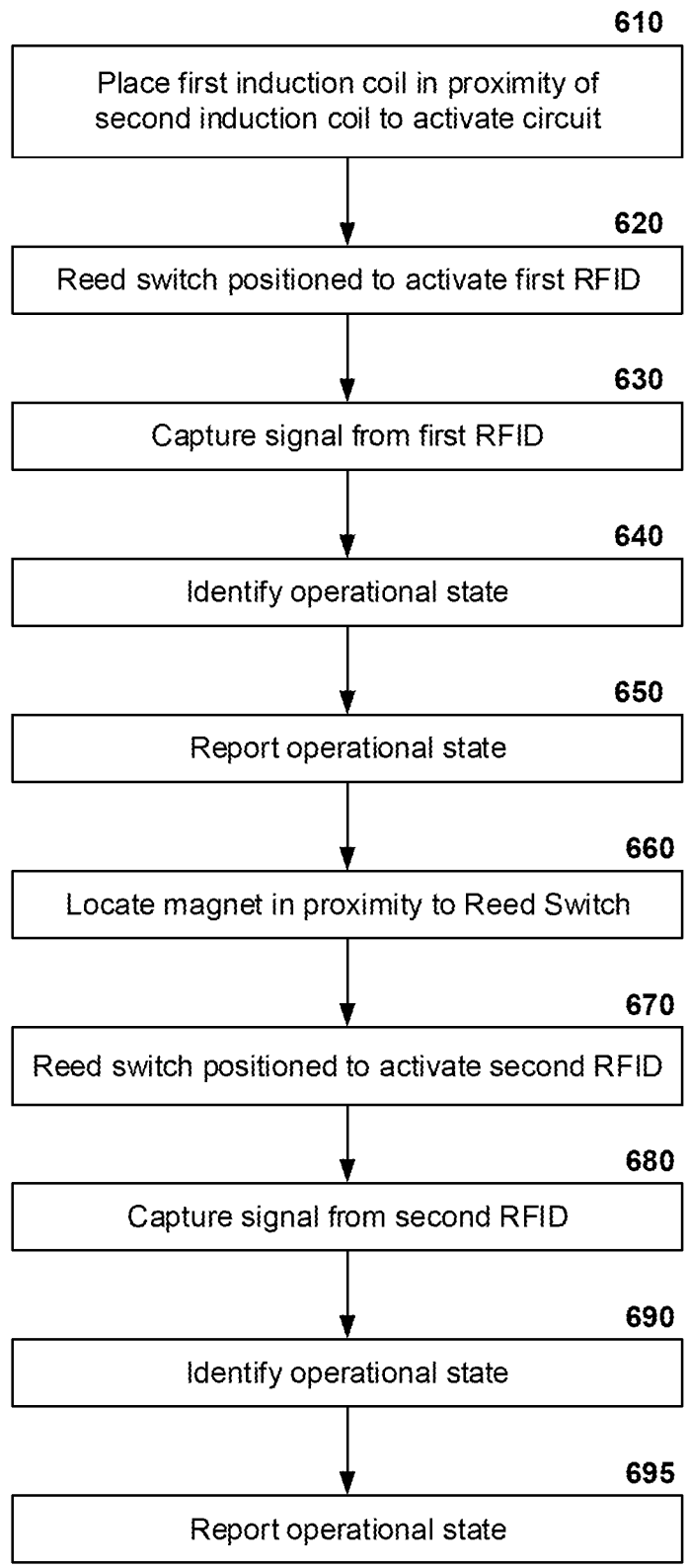
FIG. 6 is a flow diagram of an exemplary, non-limiting embodiment for utilizing RFID tags to facilitate determination of operational state(s) of a device.

FIG. 6 is flow diagram illustrating an exemplary, non-limiting embodiment for utilizing RFID tags to facilitate determination of operational state(s) of a device. At 610, a first induction coil (e.g., induction coil 135) is brought into proximity of a second induction coil (e.g., induction coil 120) such that a circuit (e.g., position sensing circuit 196) comprising a reed switch (e.g., reed switch 140), a first RFID (e.g., RFID1 150) and a second RFID (e.g., RFID2 160) is activated.

At 620, upon activating the circuit, the reed switch is in a first position and a first flow path of the circuit is active, wherein the first flow path includes the first RFID, activating the first RFID. The first RFID transmits a first RFID identifier (e.g., RFID identifier 410).

At 630 the first RFID identifier is received at a RFID transceiver (e.g., RFID transceiver 115).

At 640 the operational state of the device can be determined. A data store (e.g., data store 195/database 165) can be queried (e.g., by controller 110) to identify an operational state associated with the first RFID identifier. As previously described with reference to FIG. 1, database 165 and FIG. 3-320, the first RFID identifier can be associated with an operational state of 'closed'.

At 650, if required, the operational state associated with the first RFID identifier can be reported out (e.g., by controller 110) to a remote system (e.g., remote system 199). It is to be appreciated that the report can include any pertinent information regarding the operational state such as the first RFID identifier, machine identifier associated with the first RFID identifier (wherein the machine identifier can uniquely identify a machine, device, process, operation, and the like, associated with the first RFID identifier), operational state, time stamp for the operational state, etc.

At 660, a shaft (e.g., shaft 125) comprising the device is slidably located as part of execution of an operation of the device (e.g., where the device is a lock, moving the shaft to a particular position secures/locks the device). As previously described the shaft has a magnet (e.g., magnet 130) located thereon, where the magnet has a magnetic field of sufficient magnitude to effect positioning of reeds comprising the reed switch to the 'closed' position (the second operational position of the reed switch) when the magnet is positioned proximate to the reed switch. It is to be appreciated that the shaft can be positioned both manually or mechanically (e.g., by actuator 510).

At 670, closing of the reed switch causes a second flow path of the circuit to be active, wherein the second flow path includes the second RFID, activating the second RFID whereupon the second RFID transmits a second RFID identifier (e.g., RFID identifier 420).

At 680 the second RFID identifier is received at the RFID transceiver.

At 690, in response to the second RFID identifier, a new operational state of the device can be determined. The data store can be queried to identify the second operational state of the device, as associated with the second RFID identifier. As previously described with reference to FIG. 1, database 165 and FIG. 3-340, the second RFID identifier can be associated with an operational state of 'locked'.

At 695, if required, the operational state associated with the second RFID identifier can be reported out to a remote system. The report can include any pertinent information regarding the operational state, such as the second RFID identifier, machine identifier associated with the first RFID identifier (wherein the machine identifier can uniquely identify a machine, device, process, operation, and the like, associated with the second RFID identifier), second operational state, time stamp for the second operational state, position associated with the second RFID identifier, etc.

Figure 7:
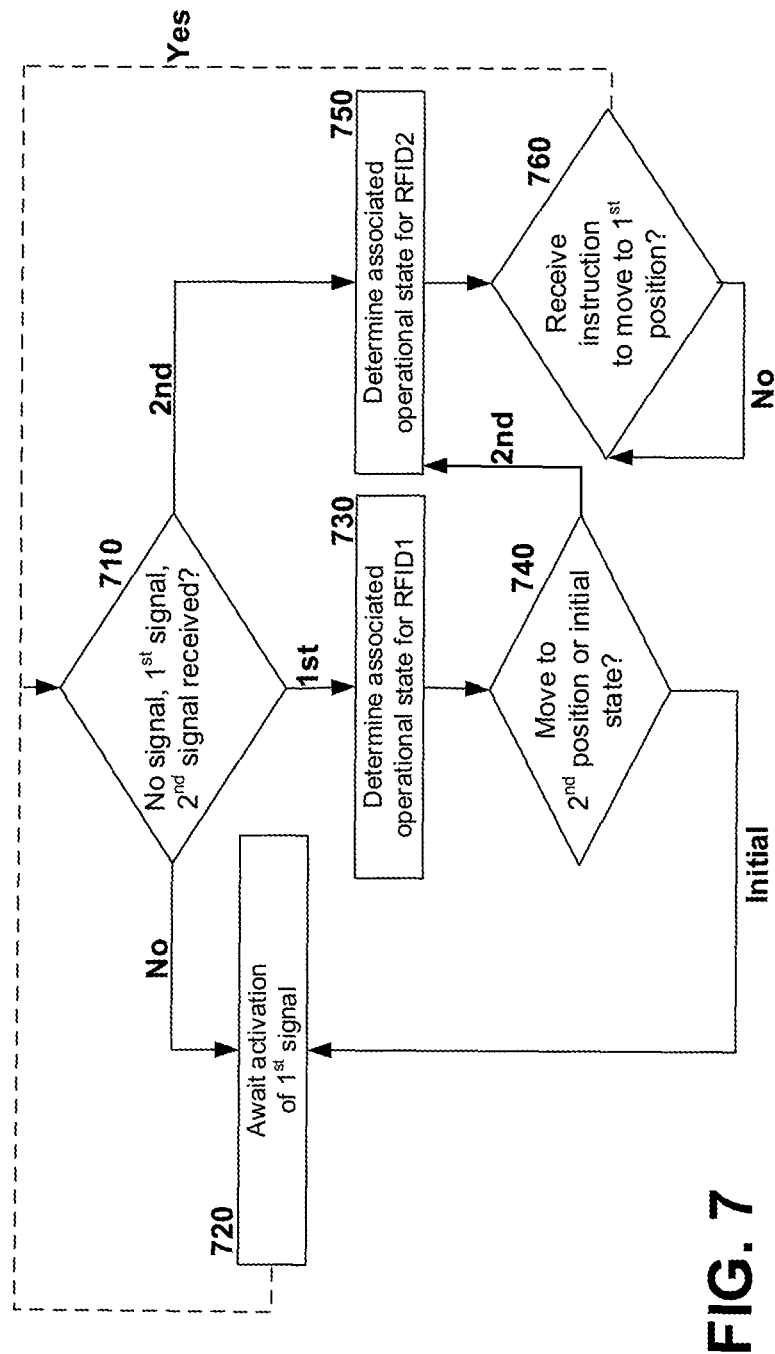
FIG. 7 is a flow diagram illustrating an exemplary, non-limiting embodiment for determine an operational state(s) of a device.

FIG. 7 is a flow diagram illustrating an exemplary, non-limiting embodiment for determining an operational state(s) of a device. At 710, a determination is made (e.g., by controller 110, remote system(s) 199, etc.) regarding whether a RFID signal is being received at an RFID transceiver (e.g., RFID transceiver 115). In response to 'No' signal being received the flow advances to 720 where activation of a first signal (e.g., from RFID1 150) is awaited. Flow returns to 710 while the first signal is being awaited.

Returning to 710, in response to a first signal being received, an operational state associated with the first signal can be determined at 730. For example, a controller receiving indication that the first signal has been received can query a data store 195/data store 165 to determine the operational state associated with the first signal (e.g., 'closed').

At 740, based upon a sequence of operations, a shaft/magnet (e.g., shaft 125, magnet 130) can be actuated to be placed at a position (e.g., position 2) associated with a second RFID (e.g., RFID2 160). Or, if an operation has been performed at the second position (e.g., the gate of FIG. 2 is to be unlocked) the device can be placed in an initial operating state (e.g., the gate of FIG. 2 is opened), whereupon the flow proceeds to 720 to await activation of the first signal.

Returning to 710, in response to a second signal (e.g., from RFID2 160) being received, an operational state associated with the second signal can be determined at 750. For example, a controller receiving indication that the second signal has been received can query a data store/database (e.g., data store 195/data base 165) to determine the operational state associated with the second signal (e.g., 'locked').

At 760, based upon a sequence of operations, the shaft/magnet can be actuated to return to the first position, e.g., position associated with the first RFID (e.g., RFID1 160). Time can elapse at 760 while the instruction to return to the first position is awaited (as indicated by flow response No'). In response to receiving an instruction for the shaft/magnet to return to the first position (e.g., the gate of FIG. 2 is being unlocked), flow returns to 710 where the next RFID signal is awaited.

Returning to 740, in response to instructions to move the shaft/magnet to the second position, flow proceeds to 750 where the operation associated with the second RFID signal is determined.

It is to be appreciated that FIG. 7 presents exemplary operational states and sequences, and while pertaining to operation of a gate/locking mechanism, the embodiments presented in FIG. 7 pertain to any sequence of operations and states for which the various embodiments presented herein can be applied.

FIG. 8 illustrates a block diagram of an exemplary, non-limiting system for providing information regarding a plurality of locations pertaining to a device. In comparison with FIGS. 1, 4, and 5, the configuration illustrated in FIG. 8 comprises a third RFID tag 810. Hence, in comparison with the system illustrated in any of FIGS. 1, 4, and 5, more than one position of shaft 125 can be sensed owing to activation (e.g., 'closing') and deactivation (e.g., 'opening') of reed switches 140 and 840. When magnet 130 is located at position 2, RFID2 160 is activated and based on the RFID2 identifier 420 received at transceiver 115 it can be determined that shaft 125 is at position 2, as previously described. As shaft 125, and accordingly magnet 130 is placed at position 3 owing to the magnetic field being of magnitude that once the magnet is sufficiently remote from reed switch 140, reed switch 140 is opened and RFID1 150 again becomes active and transmits RFID1 identifier 410.

As shaft 125, and accordingly magnet 130 is placed at position 4, owing to the magnetic field being of magnitude that once the magnet is sufficiently proximate to reed switch 840, reed switch 840 is closed and RFID3 810 becomes active and transmits RFID3 identifier 820.

The respective RFID's, positions, and positions can be compiled into a database 880 (e.g., and stored in datastore 195) which can be queried by controller 110, etc. Such operation of determining a plurality of positions associated with shaft 125/magnet 130 can be utilized in a multi-stage operation where an operation is performed at a first position, a operation is preformed at a second position, etc. In an embodiment, shaft 125/magnet 130 can be co-located with a component which is being moved to the first position, to the second position, etc., wherein the signals from the first RFID, second RFID, third RFID, etc., can be utilized to facilitate understanding of where the component is with respect to components/devices performing the operations at the first position, second position, etc.

Figure 9:
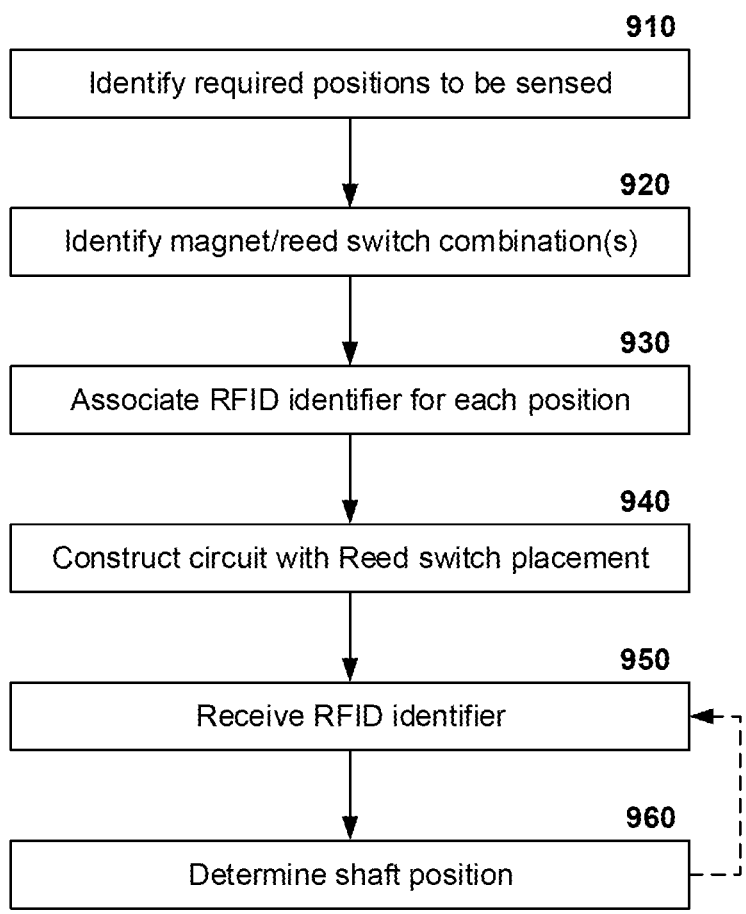
FIG. 9 presents a flow diagram illustrating an exemplary, non-limiting embodiment for utilizing RFID tags to facilitate determination of a position of a device.

FIG. 9 presents a flow diagram illustrating an exemplary, non-limiting embodiment for utilizing RFID tags to facilitate determination of a position of a device. At 910, a plurality of positions to be sensed (e.g., positions 1, 2, 3, and 4 of FIGS. 1 and 8) are identified. For example, a shaft may be linearly positioned in a plurality of locations, where at each location an operation is to be performed.

At 920, combinations of reed switches (e.g., reed switches 140 and 840) and a magnet (e.g., magnet 130) are identified to facilitate accurate determination of the shaft position. As previously described, depending upon the magnitude of a magnetic field generated by a magnet, and the sensitivity of a reed switch to the magnetic field, the reed switches can be identified to enable a first position of the magnet to be sensed by a first reed switch without causing a second reed switch to be simultaneously activated.

At 930, based upon the determined reed switches, an RFID identifier can be associated with an RFID tag to be activated in conjunction with activation of a specific reed switch. A database (e.g., database 880) can be compiled identifying a position for each RFID tag.

At 940, a circuit is constructed where respective reed switches are placed to enable determination of a particular position to be identified (e.g., a position associated with each respective reed switch and associated RFID)

At 950, as previously described, the circuit is activated and the shaft/magnet activates respective reed switches, causing an RFID tag to be activated, whereupon the RFID identifier is received at a RFID transceiver.

At 960, based upon the received RFID, the database can be queried to identify the position of the shaft/magnet. The position of the shaft/magnet can be repositioned and thus a further reed switch is activated, a new RFID identifier transmitted, as indicated by the flow returning to 950.

Figure 10:
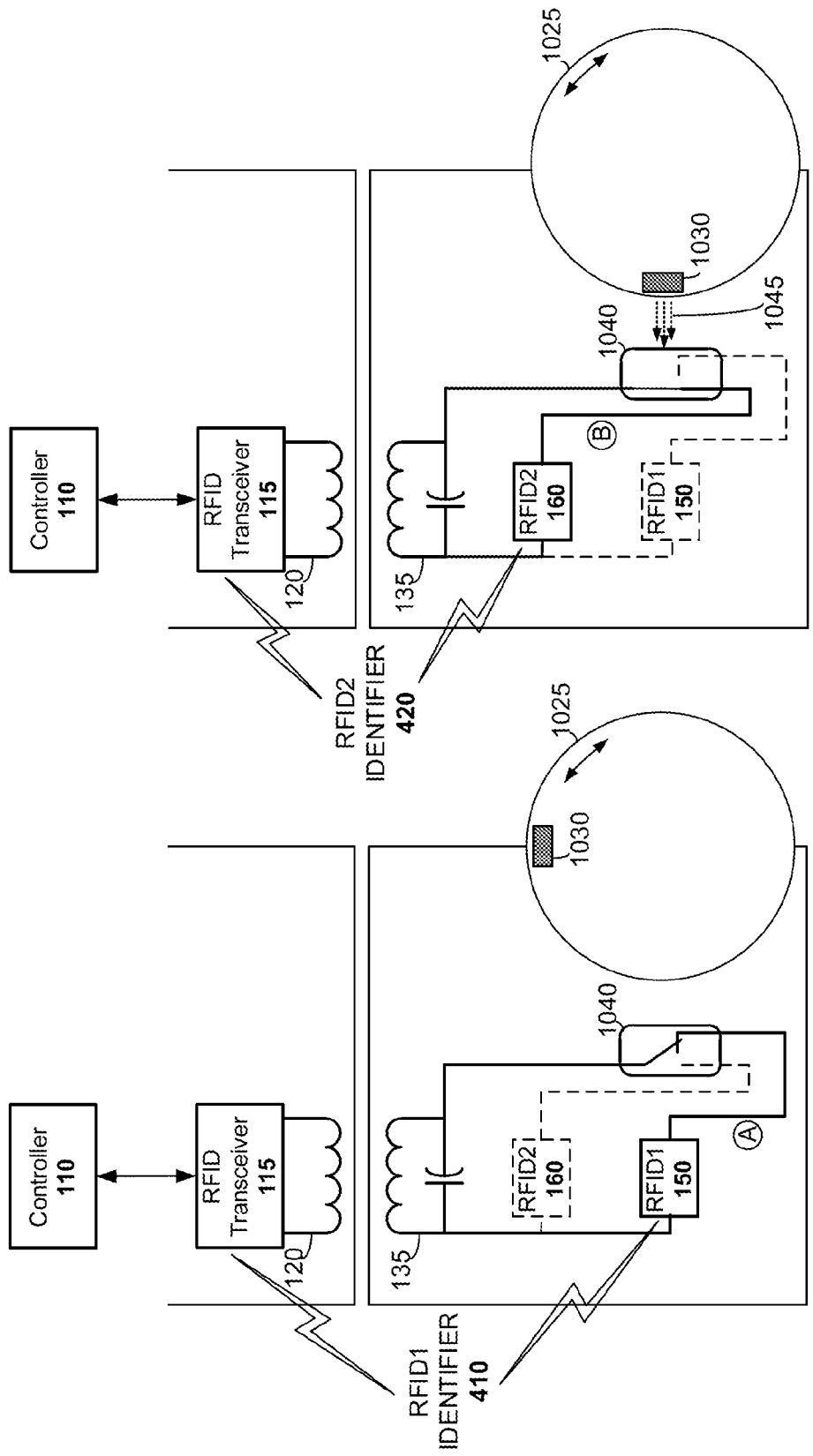
FIG. 10A is a block diagram of an exemplary, non-limiting embodiments of a magnet located on a rotating component.
FIG. 10B is a block diagram of an exemplary, non-limiting embodiments of a magnet located on a rotating component.

While the preceding discussion has primarily focused on sensing the position of a magnet located on a shaft, the various embodiments presented herein are not so limited. FIGS. 10A and 10B illustrate exemplary, non-limiting embodiments of a magnet 1030 located on a rotating component 1025 (e.g., a rotating disc, an edge of a rotating shaft, etc.). As shown in FIG. 10A, magnet 1030 is remotely located with respect to reed switch 1040 and hence, reed switch 1040 is in an unactivated state (e.g., 'open') thereby activating RFID1 150. RFID1 150 transmits RFID1 identifier 410, which is received at RFID transceiver 115.

As shown in FIG. 10B, rotating component 1025 is turned such that magnet 1030 is in proximity with reed switch 1040. The magnetic field 1045 of magnet 1030 is sufficient to cause reed switch 1040 to 'close', activating RFID2 160. RFID2 160 transmits RFID2 identifier 420, which is received at RFID transceiver 115, from which a determination can be made by controller 110 regarding the position of rotating component 1025.

It is to be appreciated that while various embodiments presented above pertain to a device in an industrial process, application of the various embodiments is not so limited and can be utilized in any operation/process requiring determination of at least one position and/or operation. For example, while FIG. 2 relates to a gate/locking mechanism, the gate/locking mechanism is not confined to an industrial process and the gate/locking mechanism can be operational in any environment such as a financial institute, home security, office environment, and the like.

Exemplary Networked and Distributed Environments

One of ordinary skill in the art can appreciate that the various embodiments of a design apparatus for industrial automation environment applications and associated methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the generation and sharing of tagsets as described for various embodiments of the subject disclosure.

Figure 11:
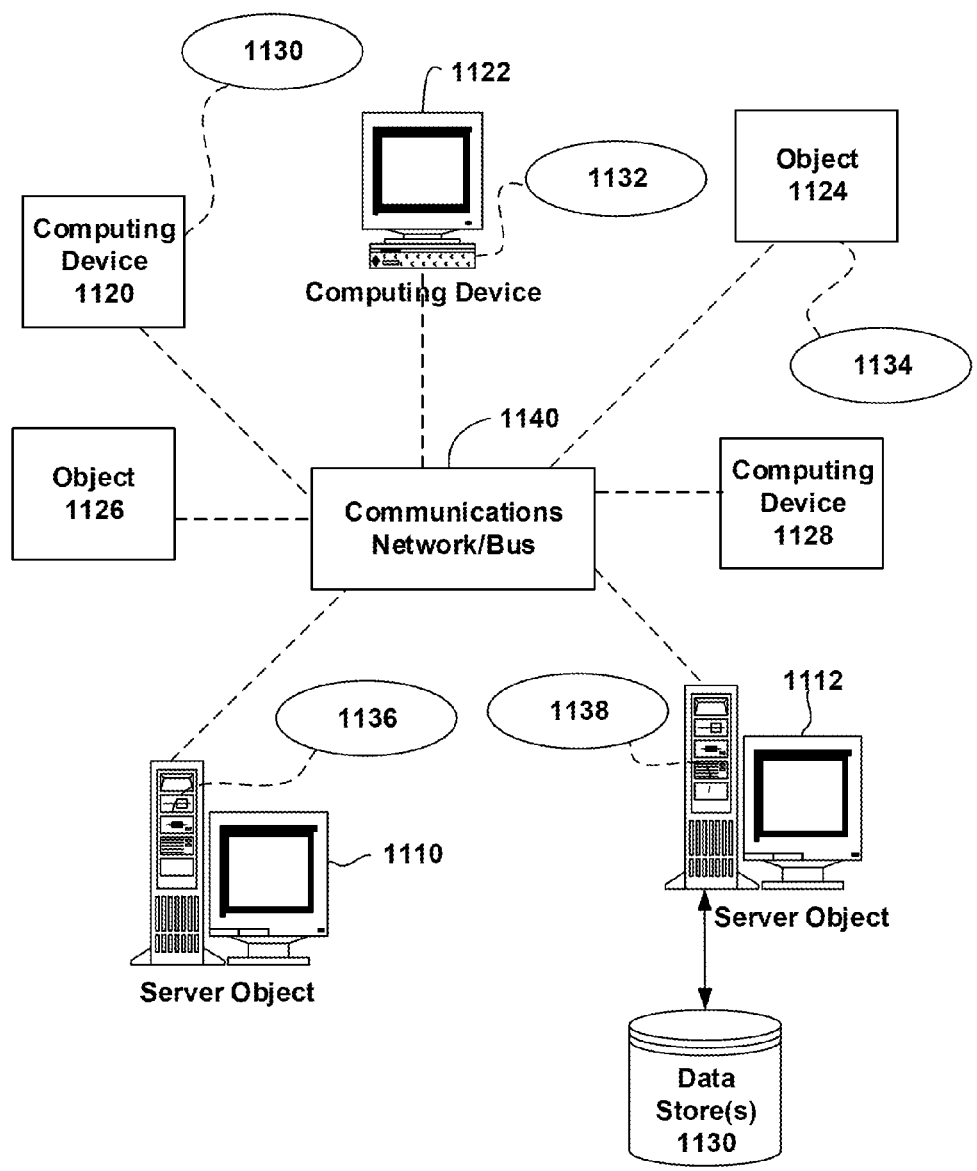
FIG. 11 illustrates an exemplary, non-limiting computing environment facilitating operation of one or more exemplary, non-limiting embodiments disclosed herein.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, communications network 1140 may comprise other computing objects and computing devices that provide services to the system of FIG. 11, and/or may represent multiple interconnected networks, which are not shown. Each computing object 1110, 1112, etc. or computing object or device 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the design apparatus and associated mechanisms in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1140 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Exemplary Computing Device

As mentioned, advantageously, the techniques described herein can be applied to any device where it is desirable to deploy an application, according to a plurality of configurations, to a plurality of devices in an industrial automation environment. It can be understood, therefore, that handheld, portable and other computing devices and computing objects of all kinds are contemplated for use in connection with the various embodiments, i.e., anywhere that where users can access, utilize, or deploy industrial applications. Accordingly, the below general purpose remote computer described below in FIG. 12 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
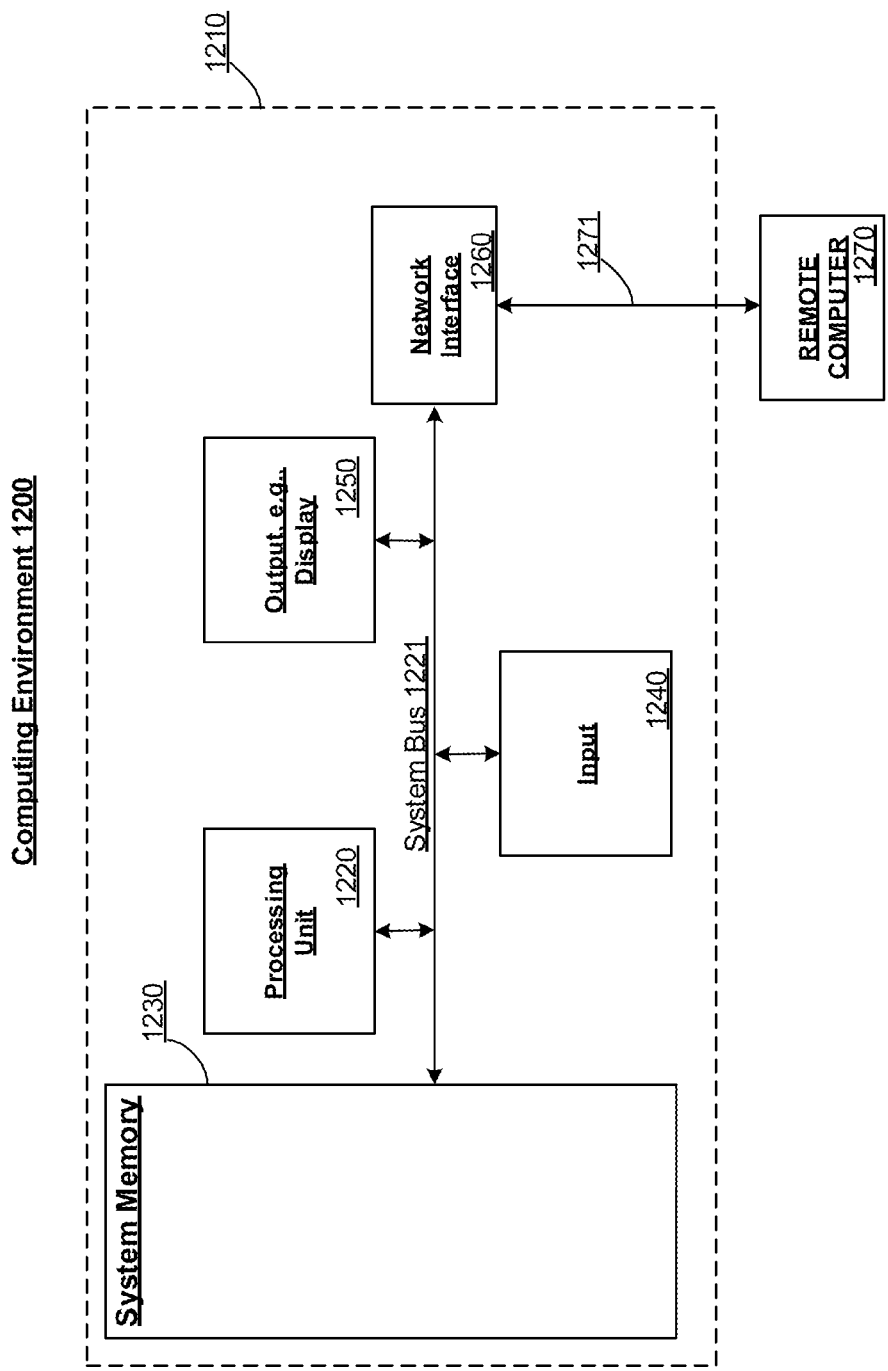
FIG. 12 illustrates an exemplary, non-limiting networking environment facilitating operation of one or more exemplary, non-limiting embodiments disclosed herein.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the exemplary computing system environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data. According to a further example, computer 2610 can also include a variety of other media (not shown), which can include, without limitation, RAM, ROM, EEPROM, flash memory or other memory technology, compact disk (CD) ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement the various embodiments presented herein regarding operation/process sensing and review of identifiers associated with RFIDs identifying the operation/process.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component", "module", "system", and the like, are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
a first device comprising a first electrical circuit comprising:
a radio frequency identification (RFID) transceiver;
a first induction coil;
a power source configured to power the first induction coil; and
an adjustable locking mechanism comprising a magnet; and
wherein, in response to the first induction coil coming within a range of a second induction coil of a second electrical circuit of a second device sufficient to activate the second electrical circuit, the RFID transceiver receives a first RFID identifier associated with a first RFID tag of the second electrical circuit, wherein the second electrical circuit comprises:
the second induction coil;
the first RFID tag;
a second RFID tag; and
a switch configured to activate the first RFID tag and deactivate the second RFID tag in response to the magnet not being proximate to the switch, and activate the second RFID tag and deactivate the first RFID tag in response to the magnet being proximate to the switch.

2. The system of claim 1, wherein, in response to the first induction coil being within the range of the second induction coil of the second electrical circuit of the second device sufficient to activate the second electrical circuit, and the adjustable locking mechanism moving into a position relative to the second device where the magnet is proximate to the switch, the RFID transceiver receives a second RFID identifier associated with the second RFID tag.

3. The system of claim 2, wherein, in response to the first induction coil being within the range of the second induction coil of the second electrical circuit of the second device sufficient to activate the second electrical circuit, and the adjustable locking mechanism moving into another position relative to the second device where the magnet is not proximate to the switch, the RFID transceiver receives the first RFID identifier associated with the first RFID tag.

4. The system of claim 1, wherein:
in response to receiving the first RFID identifier, the RFID transceiver communicates the first RFID identifier to a controller; and
in response to receiving a second RFID identifier associated with the second RFID tag, the RFID transceiver communicates the second RFID identifier to the controller.

5. The system of claim 4, wherein the controller determines a position of at least one of the first device relative to the second device or a position of the locking mechanism based on at least one of the received first RFID identifier or the received second RFID identifier.

6. The system of claim 1, wherein the switch is a reed switch.

7. The system of claim 1, wherein the locking mechanism comprises the magnet located on a shaft configured to move linearly with respect to the switch.

8. The system of claim 1, wherein locking mechanism comprises the magnet located on a rotating component configured to move rotationally to locate the magnet proximate to the switch.

9. A method comprising:
in response to a first device comprising a first electrical circuit, comprising a radio frequency identification (RFID) transceiver, a first induction coil, a power supply configured to power the first induction coil, and an adjustable locking mechanism comprising a magnet, moving to within a range of a second device, comprising a second induction coil, a first RFID tag, a second RFID tag, and a switch, sufficient to activate the second electrical circuit, receiving, by the RFID transceiver, a first RFID identifier associated with the first RFID tag, wherein the switch is configured to activate the first RFID tag and deactivate the second RFID tag in response to the magnet not being proximate to the switch, and activate the second RFID tag and deactivate the first RFID tag in response to the magnet being proximate to the switch; and communicating, by the RFID transceiver, the first RFID identifier to a controller.

10. The method of claim 9, wherein, in response to the first induction coil being within the range of the second induction coil of the second electrical circuit of the second device sufficient to activate the second electrical circuit, and the adjustable locking mechanism moving into a position relative to the second device where the magnet is proximate to the switch, receiving, by the RFID transceiver, a second RFID identifier associated with the second RFID tag, and communicating, by the RFID transceiver, the second RFID identifier to the controller.

11. The method of claim 10, wherein, in response to the first induction coil being within the range of the second induction coil of the second electrical circuit of the second device sufficient to activate the second electrical circuit, and the adjustable locking mechanism moving into another position relative to the second device where the magnet is not proximate to the switch, receiving, by the RFID transceiver, the first RFID identifier associated with the first RFID tag, and communicating, by the RFID transceiver, the first RFID identifier to the controller.

12. The method of claim 9, wherein the controller determines a position of at least one of the first device relative to the second device or a position of the locking mechanism based on at least one of the received first RFID identifier or a received second RFID identifier.

13. The method of claim 9, wherein the locking mechanism comprises the magnet located on a shaft configured to move linearly with respect to the switch.

14. The method of claim 9, wherein locking mechanism comprises the magnet located on a rotating component configured to move rotationally to locate the magnet proximate to the switch.

15. A non-transitory computer readable medium having instructions stored thereon that, in response to execution, cause a system including a processor to perform operations comprising:

in response to a first device comprising a first electrical circuit, comprising a radio frequency identification (RFID) transceiver, a first induction coil, a power supply configured to power the first induction coil, and an adjustable locking mechanism comprising a magnet, moving to within a range of a second device, comprising a second induction coil, a first RFID tag, a second RFID tag, and a switch, sufficient to activate the second electrical circuit, receiving, by the RFID transceiver, a first RFID identifier associated with the first RFID tag, wherein the switch is configured to activate the first RFID tag and deactivate the second RFID tag in response to the magnet not being proximate to the switch, and activate the second RFID tag and deactivate the first RFID tag in response to the magnet being proximate to the switch; and communicating, by the RFID transceiver, the first RFID identifier to a controller.

16. The non-transitory computer readable medium of claim 15, wherein, in response to the first induction coil being within the range of the second induction coil of the second electrical circuit of the second device sufficient to activate the second electrical circuit, and the adjustable locking mechanism moving into a position relative to the second device where the magnet is proximate to the switch, receiving, by the RFID transceiver, a second RFID identifier associated with the second RFID tag, and communicating, by the RFID transceiver, the second RFID identifier to the controller.

17. The non-transitory computer readable medium of claim 16, wherein, in response to the first induction coil being within the range of the second induction coil of the second electrical circuit of the second device sufficient to activate the second electrical circuit, and the adjustable locking mechanism moving into another position relative to the second device where the magnet is not proximate to the switch, receiving, by the RFID transceiver, the first RFID identifier associated with the first RFID tag, and communicating, by the RFID transceiver, the first RFID identifier to the controller.

18. The non-transitory computer readable medium of claim 15, wherein the controller determines a position of at least one of the first device relative to the second device or a position of the locking mechanism based on at least one of the received first RFID identifier or a received second RFID identifier.

19. The non-transitory computer readable medium of claim 15, wherein the locking mechanism comprises the magnet located on a shaft configured to move linearly with respect to the switch.

20. The non-transitory computer readable medium of claim 15, wherein locking mechanism comprises the magnet located on a rotating component configured to move rotationally to locate the magnet proximate to the switch.

* * * * *